United States Patent
Peirce

[15] 3,664,256
[45] May 23, 1972

[54] COOKING GRILL

[72] Inventor: Inez H. Peirce, 157 Camino San Clemente, San Clemente, Calif. 92672

[22] Filed: Aug. 14, 1969

[21] Appl. No.: 850,083

[52] U.S. Cl. ............................................. 99/425, 99/447
[51] Int. Cl. ....................................................... A47j 37/06
[58] Field of Search ................. 99/425, 422, 340, 402, 444, 99/446, 447, 450; 126/9, 25, 214

[56] References Cited

UNITED STATES PATENTS

| 1,783,183 | 12/1930 | Dibble | 99/425 |
| 1,954,080 | 4/1934 | Kahn | 99/425 |
| 3,252,407 | 5/1966 | Buerki | 99/446 |
| 3,267,924 | 8/1966 | Payne | 99/446 X |
| 3,324,788 | 6/1967 | La France | 99/446 X |
| 3,509,814 | 5/1970 | Karapetian | 99/445 |

Primary Examiner—Walter A. Scheel
Assistant Examiner—Arthur O. Henderson
Attorney—F. Munro Redman

[57] ABSTRACT

This invention comprises a grill cast in a form which will facilitate the ready drainage by gravity of the fatty components out of the meat being cooked thereon.

5 Claims, 6 Drawing Figures

Patented May 23, 1972

3,664,256

INVENTOR.
INEZ H. PEIRCE
BY
ATTORNEY

COOKING GRILL

This invention provides a form of cooking grill adapted to assist in the removal of fatty components from meat by providing for the ready drainage of heated and liquified juices, which are mostly fat, away from the cooking area and into a suitable disposal vessel, while at the same time it quickly sears the lean meat to retain the proteins and juices.

When an excess of hard fats is eaten, the fat tends to deposit on the walls of the arteries. It has been the concensus of medical opinion that these deposits increase the cholesterol content and interfere with the normal action of the arteries and thus of the heart. It may be fatal.

The cooking grill of the invention is shaped to be used over or on one heating element of the electric ranges in consumer use. It may also be made for use separately from the conventional electric range in a utensil such as an electric skillet.

SUMMARY

This invention provides a form of cooking grill adapted to assist in the removal of fatty components from meat by providing for the ready drainage of heated and liquified juices away from the cooking area and into a suitable disposal vessel.

My invention has been illustrated in the accompanying drawings, in which.

For a more complete understanding of the invention, the following detailed description should be considered in connection with the above-described figures of the drawings.

The grill is preferably formed as a casting of a metal which readily conducts heat, such as aluminum, copper, brass, bronze or stainless steel.

Such construction permits ready cleaning, requires only a minimum amount of upkeep, and insures that the heat will be used most advantageously.

Figure 1:
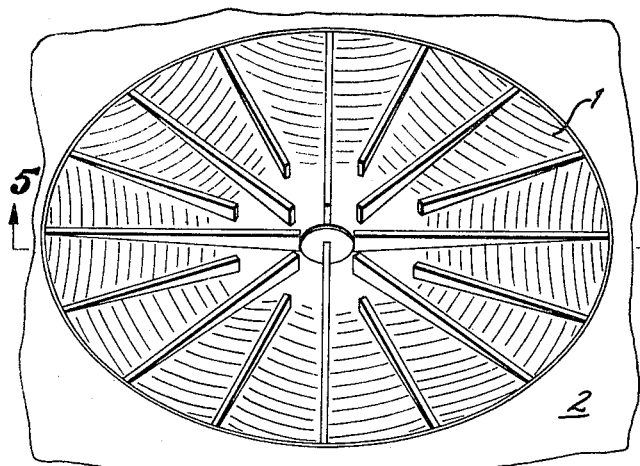
FIG. 1 is a view of the cooking grill of my invention installed flush with the top surface of a stove such as an electric range.

The grill 1 is shown in FIG. 1 as recessed into and flush with the top surface 2 of the electric element of a conventional electric stove, not otherwise shown in detail in the drawings. The bars of grill 1 rest directly on the heating element coils 4, which provide a level support therefor.

Centrally of the grill 1 is formed a downwardly extending funnel 5, in order to drain off the liquid fats and other meat juices. These liquids thus drop into a collection pan 6, and prevents the heated grease from catching fire and keeps smoke at a minimum.

Beneath the heating coils 4 and concentric about funnel 5 is placed an overflow-catching element 9, which may be removed for cleaning whenever desired. Support for such a catch-basin is already available in all commercial electric stoves.

Figure 2:
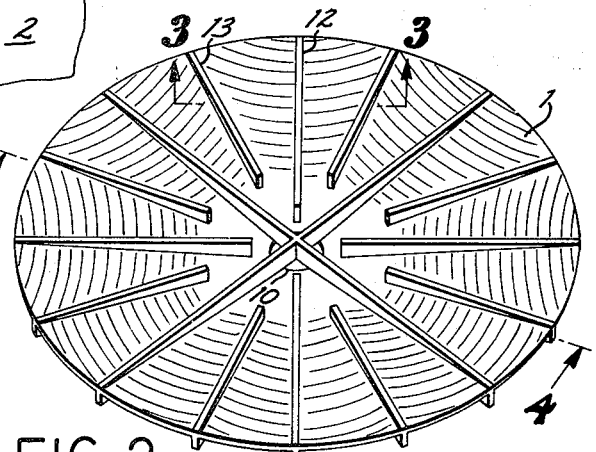
FIG. 2 is a view of the grill removed from the stove top and rotated 45° about its center to show additional details of the construction.
Figure 3:
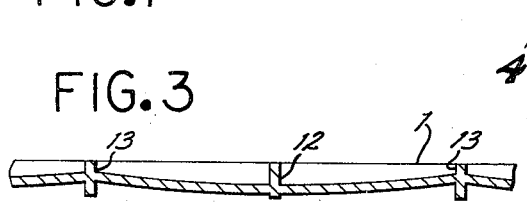
FIG. 3 is a fragmentary cross-sectional view of the grill, taken as indicated by the line 3—3 in FIG. 2.
Figure 4:
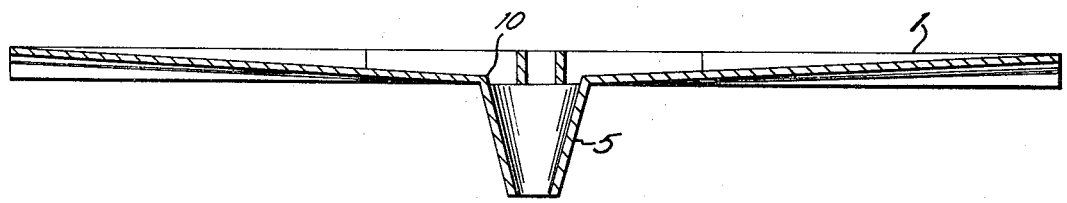
FIG. 4 is a fragmentary sectional view of the grill, taken as indicated by line 4—4 of FIG. 2.
Figure 5:
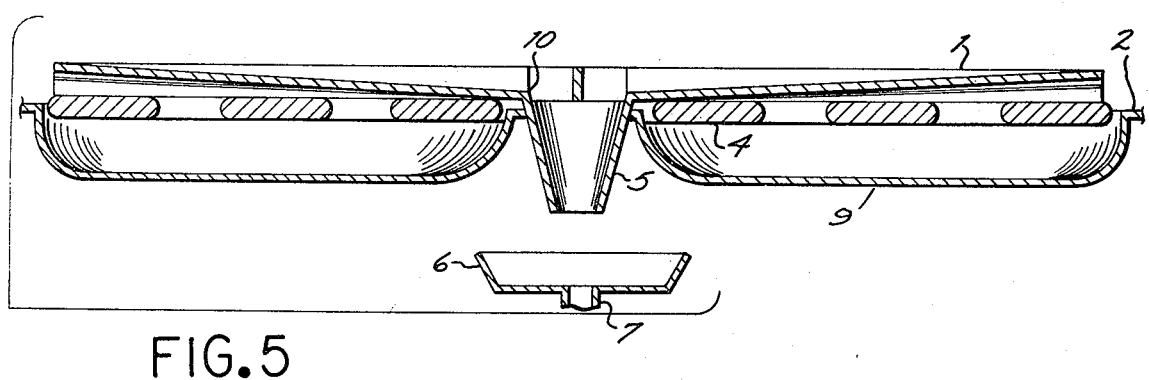
FIG. 5 is a sectional view, taken as indicated by line 5—5 in FIG. 1 and showing the relation between the heating element and the grill.

A most important feature of my invention is concerned with the configuration of the bottom of the grill 1. As may be seen most clearly by considering FIGS. 1–3 together, the portion of the grill bottom between each of the several adjacent ribs is curved downwardly and inwardly toward the central aperture 10, which constitutes the upper terminus of the funnel-shaped member 5.

Its functions may include, however, acting as an inward-reflector to confine the heat to the area beneath the heating element 4. Such an effect has the additional advantage of preventing the possibility that the hot greases might catch fire.

It may be seen that the several ribs 11, 12 and 13 serve not only to support any utensils placed on top of the heating elements 4, but also to conduct heat from the elements 4 to the top of the ribs where it is passed to the cooking utensil, not shown in the figures.

Figure 6:
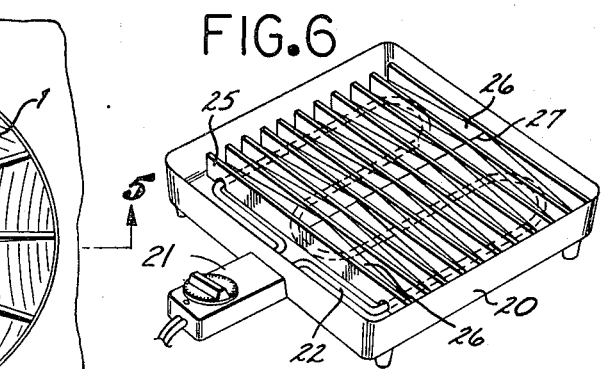
FIG. 6 is a schematic perspective showing the grill as used with a separate utensil such as an electric skillet.

In the embodiment shown in FIG. 6, the principles are applied to use in a separate electric skillet 20 having a thermostatic heating control 21. The heat is here supplied by a conventional unit 22 of the type commercially known by the trade name "Calrod." Such units have the heating element sealed inside and insulated electrically from the outer metal shell. Since such units are well known in commerce, no further description is felt warranted here.

The outer surface of the "Calrod" unit is rested on and supported by grill bars 25, which are notched to fit snugly thereagainst for ready heat transfer. Each of the grill bars 25 is preferably about one-eighth inch thick and five-eighths inch wide at its point of greatest width. All of the grill bars 25 are joined together centrally of the connecting trough portions 26, sloping downwardly from their central or highest points 27. Each of the trough portions 26 has its bottom rounded to insure the ready flow of the hot melted fatty components toward the outside of the skillet 20. The discharge of these components from the skillet may occur through a drain opening, not shown, from the bottom.

If the grill 1 is formed as a stamping rather than a casting, it is desirable that its outer periphery be shaped to extend downwardly as well as upwardly from the grill 1 in order to provide an additional reflecting surface to help concentrate the heat toward the center of the cooking area.

This grill enables the removal of the fatty components of the meat, and improves its taste and flavor, all to the health benefit of its user in avoiding the build-up of chloresterol.

I claim:

1. In a grill for a cooking device, a plurality of supporting ribs of varying lengths defining a level top surface and a level bottom surface and being connected by curved bottom portions therebetween, a discharge opening, said curved bottom portions being sloped to promote the flow downward and toward said discharge opening of the melted juices from the meat.

2. In a grill substantially as described in claim 1, said ribs so distributing the heat as to seal in the nourishing and healthy juices while melting out the undesirable oils and fats for discharge.

3. In a grill substantially as described in claim 1, said curved bottom reducing the cholesterol-producing contents of foods by draining off by gravity fats as they are melted out of the meat by the heat of the grill.

4. In a grill substantially as described in claim 1, said ribs including a plurality of reinforcing ribs also defining said level top surface and extending from the outer perimeter toward the center of a centrally apertured dished member of high heat conductivity, and a collecting vessel alined to receive liquids discharged centrally from said grill.

5. In a grill for a cooking device, plurality of supporting ribs of varying lengths defining a level top surface and a level bottom surface and being connected by curved bottom portions therebetween adapted to receive liquids and having a downward slope to discharge liquids received thereon to a suitable container.

* * * * *